(12) United States Patent
Izumi

(10) Patent No.: US 10,527,434 B2
(45) Date of Patent: Jan. 7, 2020

(54) AUTONOMOUS MOBILITY APPARATUS

(71) Applicant: Sharp Kabushiki Kaisha, Sakai, Osaka (JP)

(72) Inventor: Yuko Izumi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 221 days.

(21) Appl. No.: 15/516,073

(22) PCT Filed: Sep. 3, 2015

(86) PCT No.: PCT/JP2015/075038
§ 371 (c)(1),
(2) Date: Mar. 31, 2017

(87) PCT Pub. No.: WO2016/052068
PCT Pub. Date: Apr. 7, 2016

(65) Prior Publication Data
US 2017/0307385 A1    Oct. 26, 2017

(30) Foreign Application Priority Data
Oct. 3, 2014   (JP) ................................. 2014-204382

(51) Int. Cl.
*G01C 21/28*  (2006.01)
*G01S 19/47*  (2010.01)
*G05D 1/02*  (2006.01)

(52) U.S. Cl.
CPC .............. *G01C 21/28* (2013.01); *G01S 19/47* (2013.01); *G05D 1/0272* (2013.01); *G05D 1/0278* (2013.01)

(58) Field of Classification Search
CPC ......... G01C 21/28; G01C 22/00; G01S 19/47; G05D 1/0272; G05D 1/0278
See application file for complete search history.

(56) References Cited

U.S. PATENT DOCUMENTS

| 5,111,401 A * | 5/1992 | Everett, Jr. .......... G05D 1/0242 180/169 |
| 6,272,405 B1 * | 8/2001 | Kubota .................. G01C 21/12 342/357.31 |
| 2014/0295885 A1 * | 10/2014 | Marko .................... H04W 4/02 455/456.1 |

FOREIGN PATENT DOCUMENTS

| JP | 2005-250696 A | 9/2005 |
| JP | 2006-252350 A | 9/2006 |

* cited by examiner

*Primary Examiner* — Kira Nguyen
(74) *Attorney, Agent, or Firm* — Keating & Bennett, LLP

(57) ABSTRACT

A mobility apparatus (10) includes a position acquiring unit (3) that acquires a current position using a satellite; a control unit (1) that controls wheels (7a, 7b) along a route based on the acquired current position; and number-of-revolutions measuring units (8a, 8b) that measure numbers of revolutions of the wheels (7a, 7b). If acquiring the current position using the satellite is disabled, the control unit (1) calculates distances per revolution of the wheels (7a, 7b) from a moving distance by using the satellite and the numbers of revolutions of the wheels (7a, 7b) measured during the period in which the mobility apparatus has moved by the moving distance, calculates numbers of revolutions of the wheels (7a, 7b) at a distance by which the mobility apparatus is to move after acquiring the current position is disabled, and causes the wheels (7a, 7b) to rotate by the calculated numbers of revolutions.

20 Claims, 5 Drawing Sheets

AUTONOMOUS MOBILITY APPARATUS

TECHNICAL FIELD

The present invention relates to an autonomous mobility apparatus. More particularly, the present invention relates to an autonomous mobility apparatus that autonomously and automatically moves along a predetermined route to reach a destination on the route.

BACKGROUND ART

Autonomous mobility apparatuses are known which autonomously and automatically move along predetermined routes to reach destinations on the routes. Some autonomous mobility apparatuses estimate their current positions and control their moving directions in accordance with the estimated current positions.

Techniques using a Global Positioning System (GPS) are known, which are used by the autonomous mobility apparatuses to estimate their current positions. In acquisition of the current position using the GPS, each autonomous mobility apparatus receives a radio wave transmitted from a GPS satellite that revolves along the orbit of the Earth, and calculates and acquires its current position based on the received radio wave. The autonomous mobility apparatus holds a map indicating its moving route, identifies the current position on the map from information about the current position acquired using the GPS, autonomously moves to a destination while confirming its position on the moving route using the GPS, and reaches the destination.

Such an autonomous mobility apparatus is capable of acquiring the current position using the GPS with high precision. However, when the reception of the radio wave from the GPS satellite is disabled, the autonomous mobility apparatus is not able to acquire its current position and it is difficult for the autonomous mobility apparatus to continue the movement.

For example, the radio wave from the GPS satellite may not be received by the autonomous mobility apparatus well at a location shaded by tall buildings or a wooded location. In this case, a method is proposed in which the autonomous mobility apparatus stops until the reception of the radio wave from the GPS satellite, which has been disabled, is recovered, and the autonomous mobility apparatus restarts autonomous driving if the reception state of the radio wave is recovered within a predetermined time period.

In terms of the technique of the automatic driving on the moving route, for example, a mobile robot disclosed in PTL 1 stores wheel feature values, such as a wheel diameter and a wheel interval, which are set for each section on the moving route composed of multiple sections. The mobile robot calculates the current position based on the wheel feature values set for the section where the mobile robot is currently moving and the amount of revolution of the wheels, which is measured, and reaches a destination based on the calculated current position. The wheel feature values are calculated based on the amount of revolution of the wheels measured between a start point and an end point of the section and measured information, such as the distance of the section and the difference in angle between both ends of the section.

In PTL 2, a vehicle autonomous driving control system is disclosed, which is intended to cause a vehicle to autonomously move using a low-cost sensor such as a differential GPS (DGPS) sensor to reduce the moving difference. This system calculates the azimuth from the difference between positioning signals based on a GPS receiver, calculates the speed and the moving distance based on the numbers of revolutions of left and right driving wheels, calculates the azimuth difference and the moving difference based on comparison between the calculated values and a target route, and calculates the amount of operation of the left and right driving wheels based on the calculated azimuth difference and moving difference to increase or decrease the rotation speed of the left and right driving wheels.

CITATION LIST

Patent Literature

PTL 1: Japanese Unexamined Patent Application Publication No. 2006-252350
PTL 2: Japanese Unexamined Patent Application Publication No. 2005-250696

SUMMARY OF INVENTION

Technical Problem

When the reception state of the radio wave received from the GPS satellite is degraded at the autonomous mobility apparatus that autonomously and automatically moves using the GPS, the autonomous mobility apparatus may stop the movement and wait for the recovery of the reception state of the radio wave, as described above. However, when the radio wave from the GPS satellite is blocked because of an obstacle or the like that exists above the autonomous mobility apparatus, the possibility for the recovery of the reception state of the radio wave is low even if the time passes. In such a case, the movement of the autonomous mobility apparatus is suspended in this state. If the movement of the autonomous mobility apparatus is stopped each time the reception of the radio wave from the GPS satellite is disabled, it is not easy for the autonomous mobility apparatus to reach a target place. Accordingly, it is desirable to continue the movement while estimating the position of the autonomous mobility apparatus until the radio wave is received again even if the reception of the radio wave from the GPS satellite is disabled.

In PTL 1 described above, the mobile robot performs the autonomous driving while estimating its position without using the GPS. However, in the invention described in PTL 1, it is necessary to finely set information about the moving route, such as a slope, the shape of the wheels during the movement, and so on in the mobile robot in advance. In this case, it may not be possible to address a change of the moving route, a change in the state of the road surface on which the mobile is moving, or a change in the state of the wheels caused by, for example, a decrease in the air pressure of the wheels. In addition, there is a problem in that setting and inputting information in advance is troublesome.

In PTL 2, the inexpensive DGPS sensor with low precision is used. In this case, even the DGPS sensor is not able to accurately move in a state in which no radio wave is received from the GPS satellite.

The same applies to a case in which a satellite positioning system other than the GPS is used.

The present invention is invented in consideration of the above situation, and it is one of objects of the present invention to provide an autonomous mobility apparatus capable of automatically moving to a destination by estimating its position until radio wave is received again even if the reception state of the radio wave from a satellite in a satellite positioning system is degraded.

Solution to Problem

In order to resolve the above issues, first technical means of the present invention is characterized in that an autonomous mobility apparatus that autonomously and automatically moves along a predetermined moving route includes a storage unit that stores the moving route; a current position acquiring unit that acquires a current position of the autonomous mobility apparatus based on a radio wave transmitted from a satellite in a satellite positioning system; a wheel that is driven to cause the autonomous mobility apparatus to move; a control unit that controls the driving of the wheel along the moving route stored in the storage unit based on information about the current position acquired by the current position acquiring unit; and a number-of-revolutions measuring unit that measures a number of revolutions of the wheel wherein if the acquisition of the current position by the current position acquiring unit is disabled while the autonomous mobility apparatus is moving, the control unit calculates a moving distance per revolution of the wheel from a moving distance by which the autonomous mobility apparatus has moved based on the radio wave transmitted from the satellite and the number of revolutions of the wheel measured by the number-of-revolutions measuring unit during a period in which the autonomous mobility apparatus has moved by the moving distance, calculates a number of revolutions of the wheel at a distance by which the autonomous mobility apparatus is expected to move after the acquisition of the current position is disabled, and performs a control to cause the wheel to rotate by the calculated number of revolutions.

Second technical means is characterized in that in the first technical means, if the acquisition of the current position by the current position acquiring unit is disabled while the autonomous mobility apparatus is moving on a straight portion, which is part of the moving route, the control unit calculates the moving distance per revolution of the wheel from the moving distance by which the autonomous mobility apparatus has moved based on the radio wave transmitted from the satellite and the number of revolutions of the wheel measured by the number-of-revolutions measuring unit during the period in which the autonomous mobility apparatus has moved by the moving distance, in a distance from a start point to an end point in the straight portion, calculates a number of revolutions of the wheel corresponding to a distance of a remaining straight portion on the moving route, and performs a control to cause the wheel to rotate by the calculated number of revolutions of the wheel.

Third technical means is characterized in that the autonomous mobility apparatus described in the first or second technical means includes a magnetic sensor that detects a moving direction of the autonomous mobility apparatus and the control unit corrects a moving direction of the autonomous mobility apparatus based on the moving direction of the autonomous mobility apparatus, which is indicated in a result of the detection by the magnetic sensor, to correct the moving direction so that the autonomous mobility apparatus moves to a next destination.

Fourth technical means is characterized in that in the third technical means, the control unit changes a revolution of the wheel of the autonomous mobility apparatus to correct the moving direction of the autonomous mobility apparatus so as to be toward the next destination if the moving direction of the autonomous mobility apparatus is displaced from the moving direction toward the next destination by a predetermined angle or more as the result of the detection by the magnetic sensor and the number-of-revolutions measuring unit continues the measurement of the number of revolutions of the wheel while the current position acquiring unit is acquiring the current position based on the radio wave from the satellite.

Fifth technical means is characterized in that in the third technical means, the control unit stops the autonomous mobility apparatus and controls the driving of the wheel at a position where the autonomous mobility apparatus has stopped to correct the moving direction of the autonomous mobility apparatus so as to be toward the next destination if the moving direction of the autonomous mobility apparatus is displaced from the moving direction toward the next destination by a predetermined angle or more as the result of the detection by the magnetic sensor and the number-of-revolutions measuring unit measures the number of revolutions of the wheel except a time period in which the autonomous mobility apparatus stops to change the moving direction while the current position acquiring unit is acquiring the current position based on the radio wave from the satellite.

Sixth technical means is characterized in that in any of the first to fifth technical means, the number-of-revolutions measuring unit measures a number of revolutions of each of multiple wheels of the autonomous mobility apparatus and the control unit calculates the moving distance per revolution of each of the wheels from the moving distance by which the autonomous mobility apparatus has moved based on the radio wave transmitted from the satellite and the number of revolutions of each of the wheels measured by the number-of-revolutions measuring unit during the period in which the autonomous mobility apparatus has moved by the moving distance if the acquisition of the current position by the current position acquiring unit is disabled while the autonomous mobility apparatus is moving, calculates a number of revolutions of each of the wheels at the distance by which the autonomous mobility apparatus is expected to move after the acquisition of the current position is disabled, and performs a control to cause each of the wheels to rotate by the calculated number of revolutions.

Seventh technical means is characterized in that in any of the first to fifth technical means, the number-of-revolutions measuring unit measures a number of revolutions of each of multiple wheels of the autonomous mobility apparatus and the control unit calculates the moving distance per revolution of the wheels from the moving distance by which the autonomous mobility apparatus has moved based on the radio wave transmitted from the satellite and the numbers of revolutions of the wheels measured by the number-of-revolutions measuring unit during the period in which the autonomous mobility apparatus has moved by the moving distance if the acquisition of the current position by the current position acquiring unit is disabled while the autonomous mobility apparatus is moving and the numbers of revolutions of the respective wheels measured at the distance by which the autonomous mobility apparatus has moved based on the radio wave transmitted from the satellite are equal to each other, calculates a number of revolutions of the wheels at the distance by which the autonomous mobility apparatus is expected to move after the acquisition of the current position is disabled, and performs a control to cause each of the wheels to rotate by the calculated number of revolutions.

Advantageous Effects of Invention

According to the present invention, it is possible to provide an autonomous mobility apparatus capable of automatically moving to a destination by estimating its position until a radio wave is received again even if the reception state of the radio wave from a satellite in a satellite positioning system is degraded.

DESCRIPTION OF EMBODIMENTS

Figure 1:
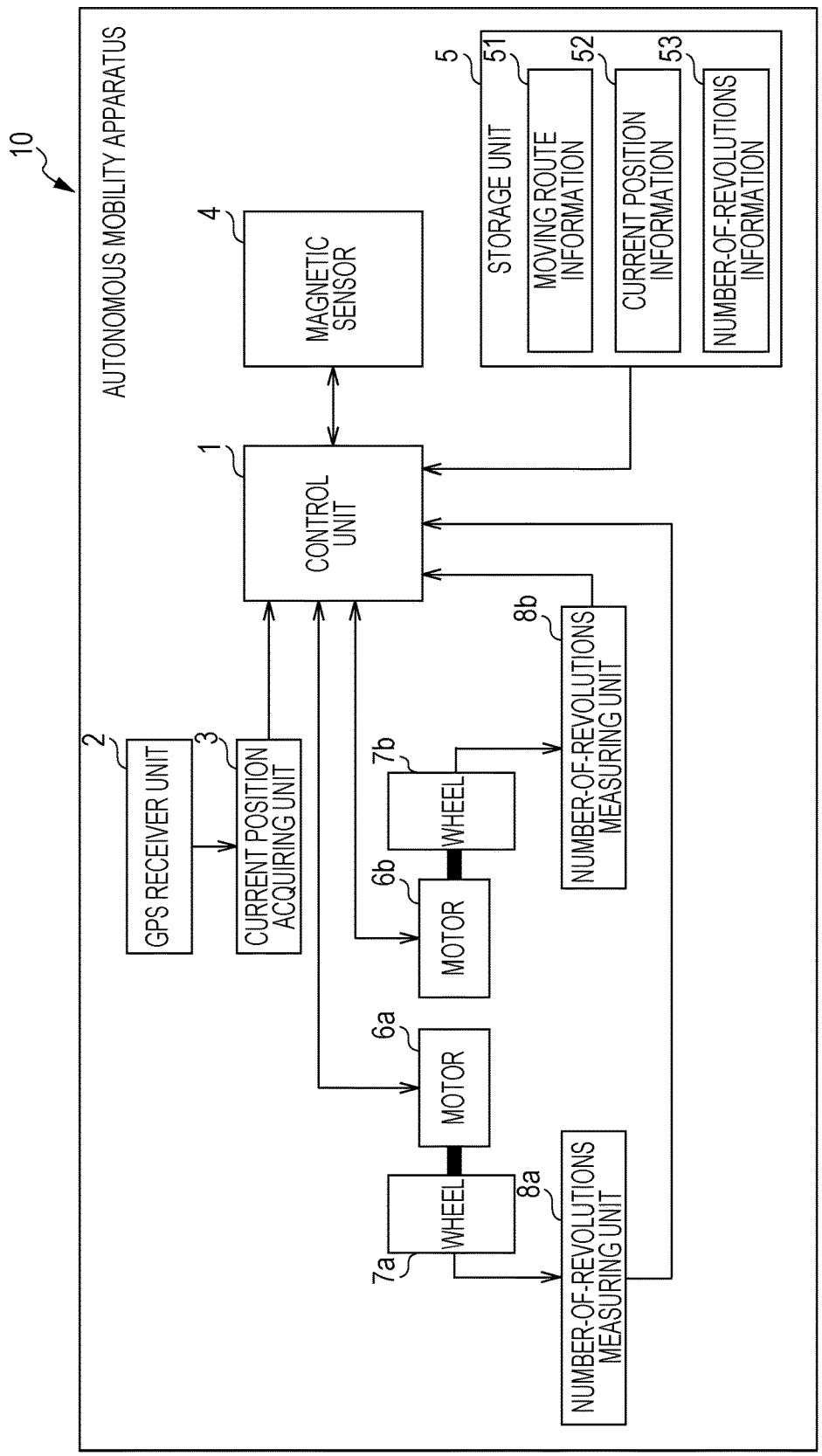
FIG. 1 is a functional block diagram for describing an embodiment of an autonomous mobility apparatus according to the present invention.

FIG. 1 is a functional block diagram for describing an embodiment of an autonomous mobility apparatus according to the present invention. A control unit 1 controls each component in an autonomous mobility apparatus 10.

A GPS receiver unit 2 receives a radio wave transmitted from a GPS satellite and supplies the radio wave to a current position acquiring unit 3. The current position acquiring unit 3 calculates the current position of the autonomous mobility apparatus 10 based on the GPS radio wave received by the GPS receiver unit 2 to acquire the current position of the autonomous mobility apparatus 10. Although an example using the GPS is described below, another satellite positioning system (regional navigation satellite system) similar to the GPS may be applied. The satellite positioning system is, for example, a Japanese Quasi-Zenith Satellite System (QZSS), a Russian Global Navigation Satellite System (GLONASS), a EU Galileo, a Chinese BeiDou Navigation Satellite System, or an Indian Regional Navigational Satellite System (IRNSS).

A magnetic sensor 4 detects by measuring geomagnetism the direction in which the magnetic sensor 4 is directed. The magnetic sensor 4 detects the direction in which the autonomous mobility apparatus 10 is moving and supplies the result of the detection to the control unit 1.

Moving route information 51 indicating a moving route on which the autonomous mobility apparatus 10 moves is stored in advance in a storage unit 5. In addition, current position information 52, which indicates the current position acquired by the current position acquiring unit 3, and number-of-revolutions information 53, which indicates the numbers of revolutions of wheels measured by number-of-revolutions measuring units 8a and 8b, are stored in the storage unit 5.

The autonomous mobility apparatus 10 further includes at least two wheels 7a and 7b, motors 6a and 6b for rotating and driving the wheels 7a and 7b, respectively, and the number-of-revolutions measuring units 8a and 8b, which measure the numbers of revolutions of the wheels 7a and 7b, respectively, as a driving unit for autonomous driving on the moving route. Revolutions of the motors 6a and 6b is controlled by the control unit 1.

The autonomous mobility apparatus 10 normally has four or more wheels, and the number-of-revolutions measuring units 8a and 8b, which measure the numbers of revolutions of the wheels 7a and 7b, are provided for the two wheels 7a and 7b provided on both sides of the vehicle body of the autonomous mobility apparatus 10, among the wheels. The number-of-revolutions measuring units 8a and 8b may measure the number of revolutions of any one of the wheels. For example, a track link (Caterpillar (registered trade mark)) or the like may be mounted on the wheels provided on both sides of the vehicle body. Also in this case, it is possible to measure the number of revolutions.

Furthermore, a battery (a rechargeable battery) is provided in the autonomous mobility apparatus 10. The rechargeable battery is a portion that supplies power to each functional component of the vehicle. For example, the rechargeable battery is a portion that supplies power to parts that realize functions including a moving function, a current-position acquiring function, object recognizing functions (an object distance detecting function, a road surface determining function, and so on), and a communication function. For example, a lithium ion battery, a nickel hydride battery, a Ni—Cd battery, a lead battery, a fuel battery, or an air battery is used as the rechargeable battery.

With the above configuration, if the acquisition of the current position by the current position acquiring unit 3 is disabled while the autonomous mobility apparatus 10 is moving, the control unit 1 calculates moving distances per revolution of the wheels 7a and 7b from the moving distance by which the autonomous mobility apparatus 10 has moved based on the radio wave from the GPS satellite, received by the GPS receiver unit 2, and the numbers of revolutions of the wheels 7a and 7b measured by the number-of-revolutions measuring units 8a and 8b, respectively, during the period in which the autonomous mobility apparatus 10 has moved by the moving distance. Then, the control unit 1 calculates the numbers of revolutions of the wheels 7a and 7b at the distance by which the autonomous mobility apparatus 10 is expected to move after the acquisition of the current position has been disabled and performs a control to cause the wheels 7a and 7b to rotate by the calculated numbers of revolutions. Accordingly, it is possible to realize the automatic driving to a destination by estimating its position until the radio wave is received again even if the reception state of the radio wave from the GPS satellite is degraded.

No autonomous mobility apparatus in prior arts calculates the numbers of revolutions of the wheels to a destination after the apparatus is not able to use the GPS based on the past moving record using the GPS for movement but, with the configuration of the present embodiment, it is possible to move to a destination by estimating the numbers of revolutions of the wheels to the destination based on the past moving record using the GPS even if the radio wave is not received from the GPS satellite and the reception state is not recovered.

In addition, if the control unit 1 determines that the moving direction of the autonomous mobility apparatus 10 is not toward the destination based on the moving direction, which is detected by the magnetic sensor 4, of the autonomous mobility apparatus 10 (the orientation of the vehicle body of the autonomous mobility apparatus 10), the control unit 1 controls the revolutions of the wheels 7a and 7b on both side of the vehicle body of the autonomous mobility apparatus 10 to adjust the orientation of the vehicle body so that the moving direction is toward the destination. For example, one of the left and right wheels of the vehicle body of the autonomous mobility apparatus 10 is stopped or the revolution speed of one of the left and right wheels is made slower than that of the other wheel to correct the moving direction of the vehicle body. The process of correcting the moving direction based on the result of the detection by the magnetic sensor 4 may be performed both in a case in which the acquisition of the current position using the GPS is enabled and in a case in which the acquisition of the current position using the GPS is disabled. Accordingly, even when the moving direction of the autonomous mobility apparatus 10 is displaced from the direction toward the destination due to, for example, the environment of the moving route, it is possible to correct the moving direction appropriately. Furthermore, a configuration may be applied in which the process of correcting the moving direction with the magnetic sensor 4 is not performed.

Embodiments of the autonomous mobility apparatus 10, which autonomously moves on the moving route with the above configuration, will be described hereinafter. Components and operations featuring the respective embodiments will be described in the following embodiments and a duplicated description of features common to the respective embodiments will be omitted herein.

First Embodiment

Figure 2:
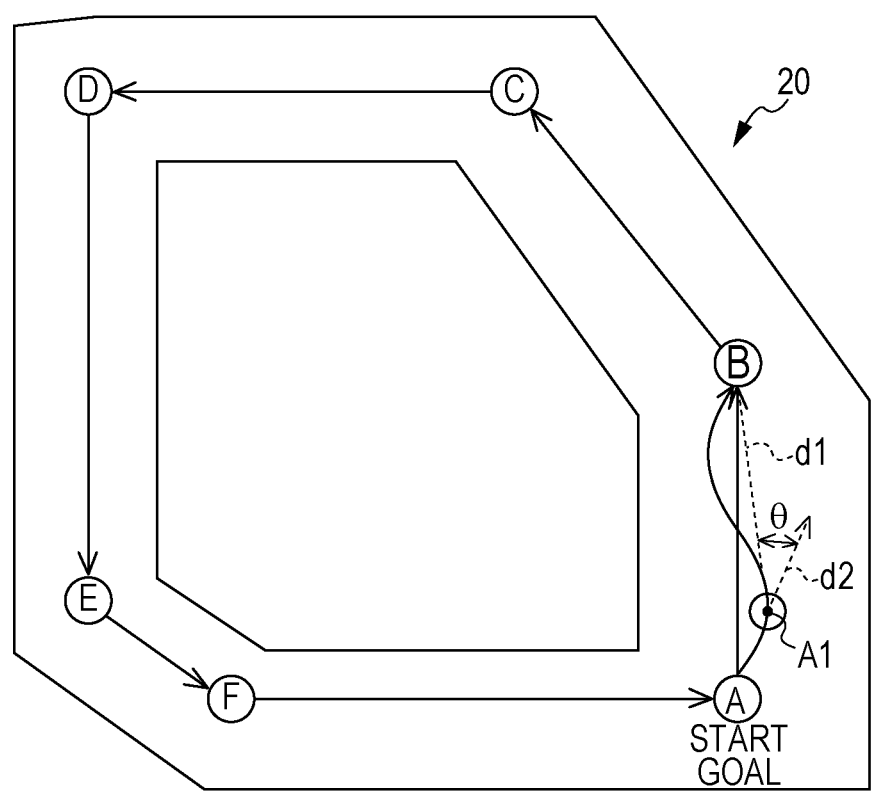
FIG. 2 illustrates an exemplary moving route on which an autonomous mobility apparatus moves.

FIG. 2 illustrates an exemplary moving route on which the autonomous mobility apparatus 10 moves. Information about a moving route 20 illustrated in FIG. 2 is stored as the moving route information 51 in the storage unit 5 in the autonomous mobility apparatus 10. The autonomous mobility apparatus 10 autonomously moves along the moving route 20 in accordance with the moving route information 51 stored in the storage unit 5. As illustrated, a point A is set as a start point and it moves on a straight line path to a point B. It changes the moving direction at the point B and moves on a straight line path to a point C. When it changes the moving direction at the point B, it rotates the wheels 7a and 7b on both side of the vehicle body in opposite directions for a stationary turn.

After it has moved to the point C, it performs the stationary turn in the same manner and moves on a straight line path to a point D. It passes through a point E and a point F in the same manner and returns to the point A, which is the first start point. The point A is a final destination on the moving route 20. The points B, C, D, E, and F are set as individual destinations on the respective straight line paths.

In the first embodiment according to the present invention, the current position acquiring unit 3 acquires the current position of the autonomous mobility apparatus 10 based on the radio wave from the GPS satellite, which is received by the GPS receiver unit 2. The control unit 1 performs a control to autonomously move on the moving route while confirming the position on the moving route using the current position information in accordance with the moving route information 51 stored in the storage unit 5. While the radio wave from the GPS satellite is received well, it moves on the moving route based on the information about its position, which is acquired based on the GPS radio wave, and reaches the final destination.

If the reception state of the radio wave from the GPS satellite is degraded due to an obstacle or the like and the acquisition of the current position using the GPS is disabled while the autonomous mobility apparatus 10 is autonomously moving using the GPS, the autonomous mobility apparatus 10 moves to the next destination while estimating its position using the following method.

In this case, the autonomous mobility apparatus 10 measures the numbers of revolutions of the wheels 7a and 7b by using the number-of-revolutions measuring units 8a and 8b, respectively, while the acquisition of the current position using the GPS is enabled. If the acquisition of the current position information using the GPS is disabled, the control unit 1 calculates the moving distance per revolution of each of the wheels 7a and 7b using the moving distance and the numbers of revolutions of the wheels 7a and 7b measured by the number-of-revolutions measuring units 8a and 8b, respectively, for the straight portion on which it has moved using the GPS. The control unit 1 acquires the distance of the remaining straight portion on which it has not moved, in the straight portion on which it is currently moving, from the moving route information 51, and calculates the numbers of revolutions of the wheels 7a and 7b corresponding to the remaining straight portion, on which it is expected to move, from the distance of the remaining straight portion, on which it is expected to move, and the calculated moving distances per revolution of the wheels 7a and 7b. The wheels 7a and 7b are performed to cause to be rotated by the calculated numbers of revolutions. Accordingly, it is possible to move to the next destination based on the numbers of revolutions of a wheel, which are calculated from the distance by which the move has actually been performed using the GPS, even after the acquisition of the current position using the GPS is disabled. In the present embodiment, the moving distance per revolution of each of the two wheels 7a and 7b is calculated and the revolutions of each of the wheels 7a and 7b is controlled based on the moving distance per revolution of each of the wheels 7a and 7b after the acquisition of the current position using the GPS is disabled.

The above process will now be described, taking the moving route 20 in FIG. 2 as an example in which if the autonomous mobility apparatus 10, which has started from the point A in accordance with the current position information acquired using the GPS, has not been enabled to acquire the current position using the GPS while moving on a point between the point A and the point B, the distance from the point A to the point travelled so far is acquired from the information about the movement based on the GPS, and the moving distances per revolution of the wheels 7a and 7b between the point A to the point travelled so far is calculated. Then, the distance from the point where the acquisition of the current position using the GPS is disabled to the point B from the moving route information is acquired, the numbers of revolutions of the wheels 7a and 7b required to reach the point B is calculated, and the wheels 7a and 7b are causes to rotate by the revolutions. The autonomous mobility apparatus 10 is able to reach the point B in the above manner.

When the autonomous mobility apparatus 10 reaches the point B, the autonomous mobility apparatus 10 changes its moving direction based on the moving route information 51 through a stationary turn and sets the point C, which is the next destination. If the acquisition of the current position using the GPS is disabled also at this time, the numbers of revolutions of the wheels 7a and 7b, which are necessary to move to the next point C, are calculated based on the calculated moving distance per revolution of each of the wheels 7a and 7b and each of the wheels 7a and 7b is caused to rotate by the calculated number of revolutions.

If the acquisition of the current position using the GPS becomes possible while moving, it is possible to return to the movement based on the acquired current position information and to move autonomously. It is possible for the mobility apparatus to continue the autonomous driving while estimating its position based on the moving distances per revolution of the wheels in the above manner even after the acquisition of the current position using the GPS is disabled.

In addition, in the present invention, if the autonomous mobility apparatus 10, which is moving based on the control process described above, is displaced from the moving route on which it is expected to move, its moving direction is corrected using the result of the detection by the magnetic sensor 4.

For example, the autonomous mobility apparatus 10, which has started from the point A, acquires the current position at the point A using the GPS and sets the point B as the first destination to start the movement. The autonomous mobility apparatus 10 determines whether the moving direction is toward the point B using the result of the detection by the magnetic sensor 4 when the autonomous mobility apparatus 10 starts from the point A, and if it is not toward the point B, a stationary turn at this position is performed to set the moving direction toward the point B. In the stationary turn, the revolution directions of the left and right wheels are reversed to turn the autonomous mobility apparatus 10 at that position. The counting of the numbers of revolutions of the wheels 7a and 7b is not started at this time.

Then, the autonomous mobility apparatus 10 starts the movement toward the point B. The counting of the number of revolutions of each of the wheels 7a and 7b is started upon start of the movement. The autonomous mobility apparatus 10 acquires the current position based on the radio wave from the GPS satellite at a predetermined interval and confirms its moving direction from the result of the detection by the magnetic sensor 4. For example, it is assumed that the current position is displaced to the position of a point A1. The autonomous mobility apparatus 10 calculates an angle $\theta$ formed by a line d1 interconnecting the current position A1 and the point B and a moving direction d2 of the autonomous mobility apparatus 10 and compares the angle $\theta$ with a predetermined threshold value (the first threshold value). If the angle $\theta$ is greater than the first threshold value, the autonomous mobility apparatus 10 adjusts the revolution of the left and right wheels 7a and 7b to set the moving direction toward the point B. In order to adjust the revolution of the wheels 7a and 7b, for example, the revolution speed of one of the left and right wheels is made slower than that of the other wheel or is made faster than that of the other wheel.

The autonomous mobility apparatus 10 repeats the above operation, and upon acquisition of the current position using the GPS, the autonomous mobility apparatus 10 acquires its moving direction from the result of the detection by the magnetic sensor 4 and adjusts the revolutions of the wheels 7a and 7b in accordance with the result of the acquisition to correct the moving direction toward the point B.

Here, the second threshold value smaller than the first threshold value is set in advance, and if the angle $\theta$ is smaller than the second threshold value, the left and right wheels are caused to rotate equally (the revolution speeds of the left and right wheels are made equal) and the autonomous mobility apparatus 10 continues the movement.

In the above control, the revolutions of the wheels 7a and 7b are adjusted based on the result of the detection by the magnetic sensor 4 and the autonomous mobility apparatus 10 moves to the destination while snaking across the straight moving route.

The correction and control of the moving direction based on the result of the detection by the magnetic sensor 4 may be performed also when the acquisition of the current position using the GPS is disabled. For example, when the acquisition of the current position using the GPS is disabled, the numbers of revolutions of the wheels to the next destination are calculated from the revolution count of the wheels so far and the straight moving distance and the movement is stared. Here, the autonomous mobility apparatus 10 acquires its moving direction based on the result of the detection by the magnetic sensor 4 and corrects the moving direction through a stationary turn when the acquired moving direction is displaced from the direction toward the next destination.

Through the above control, even after the acquisition of the current position using the GPS is disabled, it is possible to continue the movement to the destination based on the result of the counting of the numbers of revolutions of the wheels and the moving distance during the acquisition of the current position using the GPS is enabled.

It is possible to move to the final destination more accurately by correcting the displacement during the movement based on the result of the detection by the magnetic sensor 4.

Figure 3:
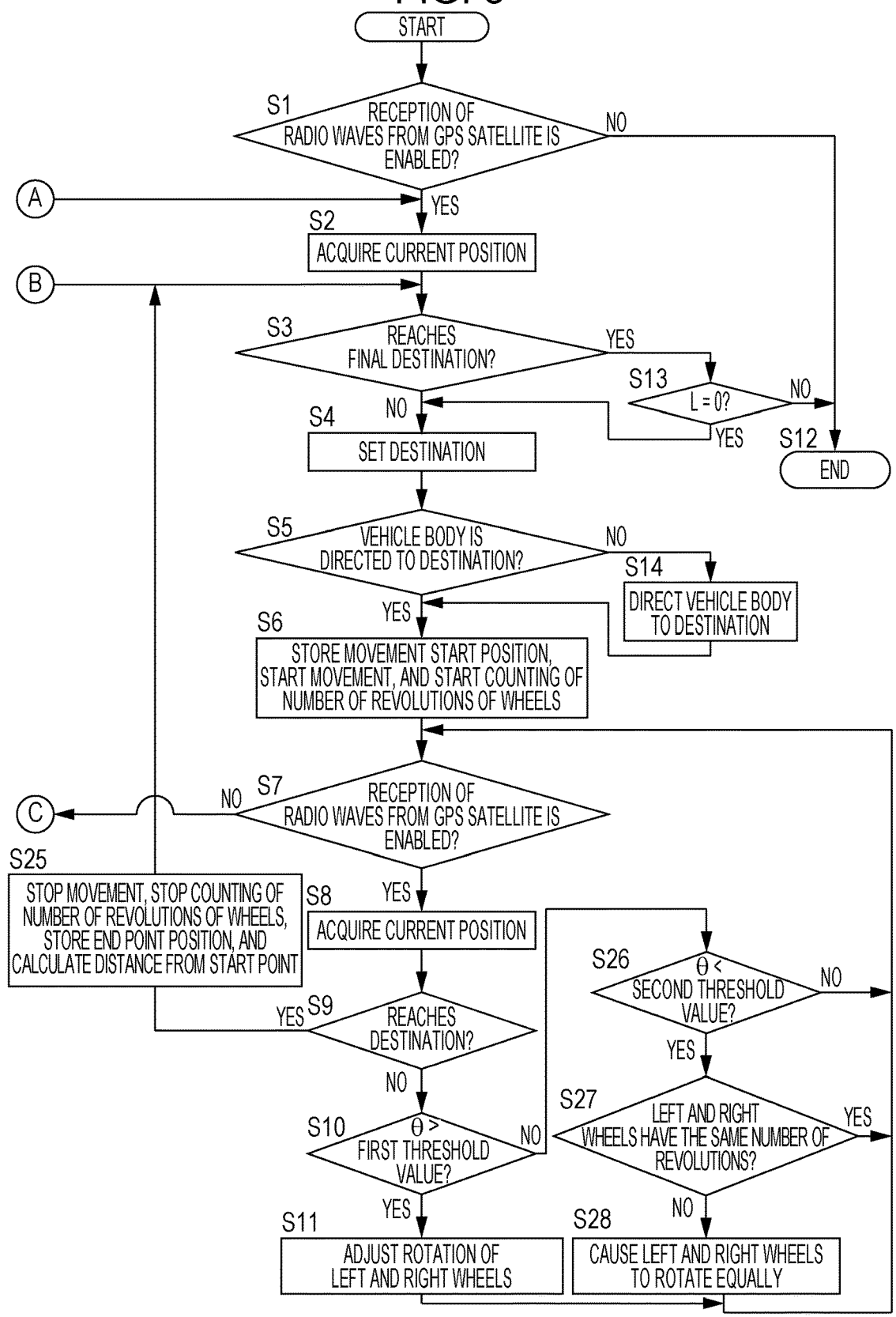
FIG. 3 is a flowchart for describing an exemplary process performed by an autonomous mobility apparatus of the first embodiment.
Figure 4:
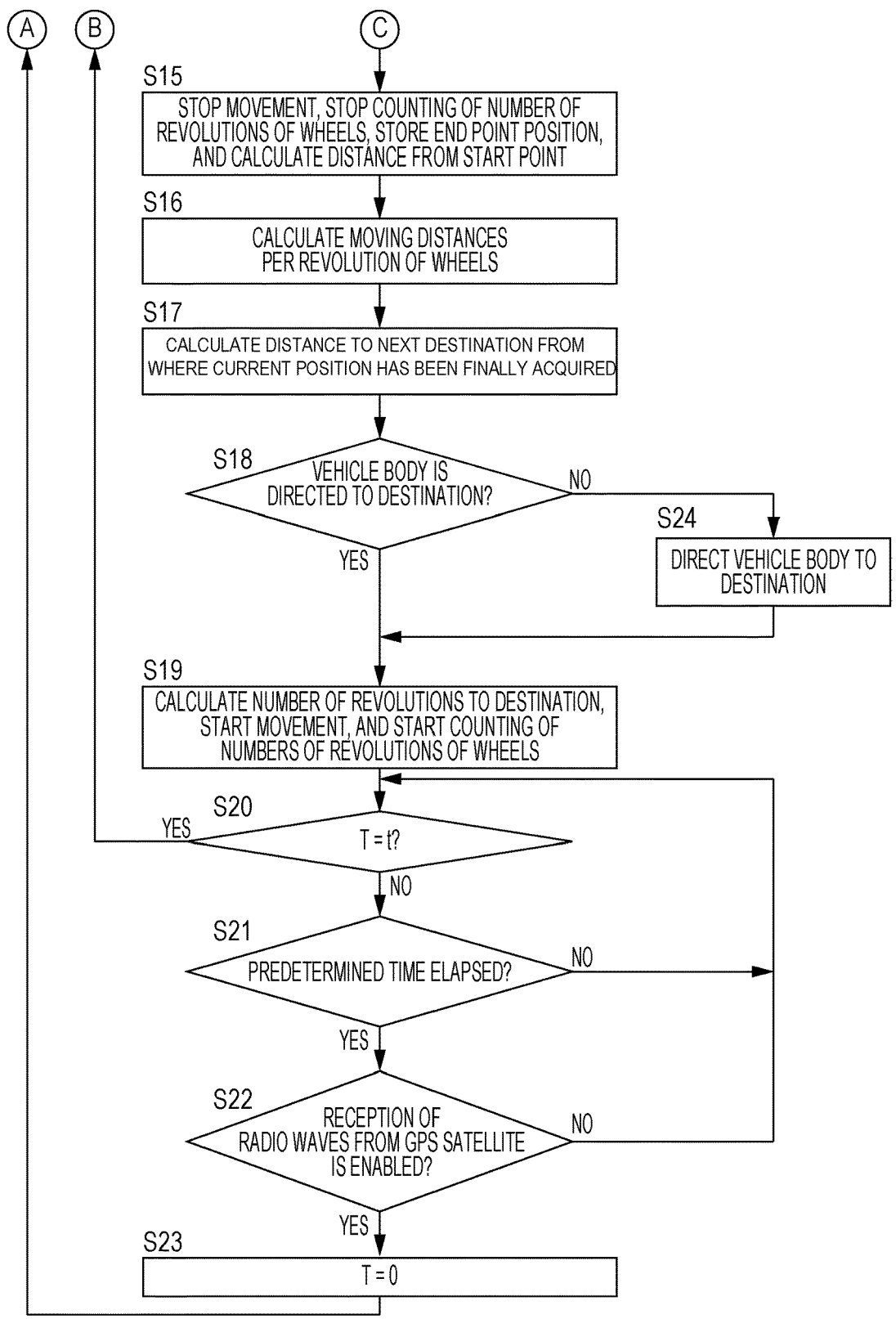
FIG. 4 is a flowchart for describing the exemplary process performed by an autonomous mobility apparatus of the first embodiment, which follows the flowchart in FIG. 3.

FIG. 3 and FIG. 4 are flowcharts for describing an exemplary process performed by the autonomous mobility apparatus of the first embodiment.

The autonomous mobility apparatus 10 is able to acquire its current position by receiving the radio wave from the GPS satellite and it to perform the autonomous driving based on the acquired current position. First, the autonomous mobility apparatus determines whether the reception of the radio wave from the GPS satellite is enabled (Step S1). If the autonomous mobility apparatus is in a state in which the reception of the radio wave from the GPS satellite is disabled, the process is terminated (Step S12). In the case where the acquisition of the current position information using the GPS is disabled at a time when no movement has been performed, it is not possible to perform continuous movements, because the moving distances corresponding to the past numbers of revolutions of the wheels cannot be acquired.

If the reception of the radio wave from the GPS satellite is enabled in Step S1, the autonomous mobility apparatus acquires its current position based on the radio wave from the GPS satellite (Step S2). Then, it moves on a predetermined moving route while confirming its current position acquired from the GPS. It then determines whether the autonomous mobility apparatus reaches a final destination (Step S3).

If it does not reach the final destination, it sets the next destination (Step S4). For example, when it moves on a straight portion in the moving route, a point where the straight portion ends and the moving route bends is set as the next destination.

If it reaches the final destination in Step S3, it is determined whether a total straight-ahead moving distance L of the autonomous mobility apparatus is equal to zero (L=0) (Step S13). If L=0, the process goes to Step S4 and the autonomous mobility apparatus sets the next destination. In the case of a circular moving route, the start point may coincide with the final destination, and in this case, since the autonomous mobility apparatus is in a non-start state in which it has not started movement on the moving route if L=0 when the autonomous mobility apparatus exists at the final destination, it sets the destination at the next corner. If L=0 is not established, the process is terminated (Step S12). This is because, since the autonomous mobility apparatus has started the movement if L=0 is not established, it is considered that it has moved on the moving route from the start position and has reached the final destination.

After the next destination is set in Step S4, it is determined whether the vehicle body of the autonomous mobility apparatus is directed to the destination (Step S5). The determination of whether being directed to the destination is based on the direction of the destination when the destination is set based on the moving route information and the moving direction of the autonomous mobility apparatus detected by the magnetic sensor.

If the vehicle body of the autonomous mobility apparatus is directed to the destination, the autonomous mobility apparatus stores the movement start position and starts the movement. The autonomous mobility apparatus starts counting of a number of revolutions T' of the wheel at the start of the movement (Step S6).

If the vehicle body of the autonomous mobility apparatus is not directed to the destination in Step S5, the vehicle body is directed to the destination (Step S14). Here, the revolutions of the wheels on both sides of the vehicle body of the autonomous mobility apparatus is controlled to adjust the orientation of the vehicle body so that the moving direction is toward the destination.

The autonomous mobility apparatus determines again whether the reception of the radio wave from the GPS satellite is enabled (Step S7). If the reception of the radio wave from the GPS satellite is enabled, its current position is acquired based on the received radio wave (Step S8). It is determined whether the destination is reached (Step S9). If the destination is reached, the movement is stopped and the counting of the numbers of revolutions of the wheels is stopped. The end point position where the stops are performed is stored and a distance L' from the start point is calculated in the following manner (Step S25).

$$T \leftarrow T+T'$$

where T denotes a total number of revolutions of a wheel and T' denotes the number of revolutions of the wheel counted at one straight portion on the moving route.

$$L \leftarrow L+L'$$

where L denotes the total straight-ahead distance and L' denotes the straight-ahead distance by which the movement is performed on one straight portion on the moving route.

Then, the number of revolutions T' of the wheel is reset to T'=0 and the straight-ahead distance L' is reset to L'=0 for the next destination. Then, the process goes back to Step S3 to determine whether the final destination is reached. If the final destination is not reached, the next destination is set.

If the destination is not reached in Step S9, the autonomous mobility apparatus determines whether $\theta$> the first threshold value holds (Step S10). Here, $\theta$ denotes the angle of the moving direction of the autonomous mobility apparatus, which is displaced from the straight line connecting the start point with the destination, in the straight portion on the moving route. It is preferable that the straight line interconnecting the start point and the destination coincides with the moving direction of the autonomous mobility apparatus.

If $\theta$> the first threshold value holds in Step S10, the revolutions of the left and right wheels (Step S11). Here, the revolutions of the left and right wheels of the vehicle body of the autonomous mobility apparatus is adjusted so that the moving direction displaced by $\theta$ is restored to the original direction. For example, one of the left and right wheels is stopped or the revolution speed of one of the left and right wheels is made slower than that of the other wheel to adjust the moving direction of the vehicle body. Then, the process goes back to Step S7 to determine whether the reception of the radio wave from the GPS satellite is enabled.

If $\theta$> the first threshold value does not hold in Step S10, it is further determined whether $\theta$< the second threshold value (Step S26). Here, the second threshold value is set so as to be smaller than the first threshold value.

If $\theta$< the second threshold value does not hold, the process goes back to Step S7 to determine whether the reception of the radio wave from the GPS satellite is enabled. If $\theta$< the second threshold value holds, it is determine whether the left and right wheels are caused to rotate equally (Step S27). The case in which the left and right wheels are caused to rotate equally corresponds to a case in which the left and right wheels of the vehicle body of the autonomous mobility apparatus rotate at the same revolution speed. If the left and right of the wheels are caused to rotate equally, the process goes back to Step S7 to determine whether the reception of the radio wave from the GPS satellite is enabled. If the left and right wheels are not caused to rotate equally in Step S7, the numbers of revolutions of the left and right wheels are made equal (Step S28). Then, the process goes back to Step S7 to determine whether the reception of the radio wave from the GPS satellite is enabled.

If the displaced angle $\theta$ of the autonomous mobility apparatus is smaller than the second threshold value set to an angle smaller than the first threshold value, the left and right wheels are caused to rotate equally and the autonomous mobility apparatus moves without adjusting the moving direction through the control of the revolutions of the wheels. This prevents the autonomous mobility apparatus from unstably moving, which may be caused by excessive adjustment.

If the reception of the radio wave from the GPS satellite is disabled in Step S7, the autonomous mobility apparatus stops the movement and stops the counting of the numbers of revolutions of the wheel. the end point position where it stops is recorded and the distance L' from the start point is calculated in the following manner (Step S15).

$$T \leftarrow T+T'$$

where T denotes the total number of revolutions of a wheel and T' denotes the number of revolutions of the wheel counted at one straight portion on the moving route.

$$L \leftarrow L+L'$$

where L denotes the total straight-ahead distance and L' denotes the straight-ahead distance of the movement on one straight portion on the moving route. Then, T'←0 and L'←0 are reset.

A moving distances per revolution of the wheels is calculated from the previous movement information (Step S16). The moving distance X per revolution of a wheel is calculated according to X=L/T.

A distance (Y) from the position where the current position has been finally acquired using the radio wave from the GPS satellite to the next destination is calculated (Step S17).

The autonomous mobility apparatus determines whether the vehicle body of itself is directed to the destination (Step S18). The determination of whether it is directed to the destination is based on the direction of the destination when the destination is set based on the moving route information and the moving direction detected by the magnetic sensor. If the vehicle body of the autonomous mobility apparatus is not directed to the destination, the vehicle body is directed to the destination (Step S24). Here, the autonomous mobility apparatus controls the revolutions of the wheels on both sides of the vehicle body of the autonomous mobility apparatus to adjust the orientation of the vehicle body so that the moving direction is toward the destination.

If the vehicle body is directed to the destination in Step S18 or if the orientation of the vehicle body is adjusted in Step S24, a number of revolutions t required to reach the destination is calculated according to t=Y/X, the movement is started, and at the same time the counting of the numbers of revolutions of the wheels is started (Step S19).

After starting the movement in Step S19, the autonomous mobility apparatus determines whether the total number of revolutions T of the wheels coincides with the number of revolutions t of the wheels required to reach the destination, that is, whether T=t holds (Step S20).

If T=t holds, the process goes back to Step S3 to determine whether the final destination is reached. If T=t does not hold, the autonomous mobility apparatus determines whether a predetermined time elapsed (Step S21). If a predetermined time has not elapsed, the process goes back to Step S20 to check whether T=t holds. If a predetermined time has elapsed, the autonomous mobility apparatus determines whether the reception of the radio wave from the GPS satellite is enabled (Step S22). If the reception of the radio wave from the GPS satellite is enabled, T=0 is set (Step S23) and, the process goes back to Step S2 and its current position is acquired through GPS communication.

If the predetermined time has not elapsed in step S21, the process goes back to Step S20 to check whether T=t holds. If the GPS communication is not enabled in Step S22, the process goes back to Step S20 to check whether T=t holds.

In the present embodiment, the calculation of the moving distances per revolution of the wheels in Step S16, the calculation of the number of revolutions of the wheels required to reach the destination in Step S19, and the determination of whether the number of revolutions of the wheels reaches the required number of revolutions of the wheels in Step S20 are performed for the two respective wheels provided on both sides of the vehicle body. The determination of whether the actual number of revolutions of the wheels reaches the required number of revolutions of the wheels may be performed at a time when the actual number of revolutions of one of the wheels reaches the required number of revolutions of the wheel. Alternatively, the determination of whether the actual number of revolutions of the wheels reaches the required number of revolutions of the wheels may be performed at a time when the actual numbers of revolutions of both of the wheels reach the required numbers of revolutions of the respective wheels.

Second Embodiment

In the above embodiment, in the correction of the moving direction of the autonomous mobility apparatus 10 based on the result of the detection by the magnetic sensor 4, the revolutions (the revolution speeds) of the left and right wheels are adjusted. In contrast, in the present embodiment, if the moving direction is displaced from the moving direction toward the destination by a predetermined angle or more in the correction of the moving direction of the autonomous mobility apparatus 10 using the result of the detection by the magnetic sensor 4, the autonomous mobility apparatus 10 is stopped and a stationary turn is performed at that position to correct the moving direction toward the destination.

A control example at this time will now be described with reference to FIG. 5.

Figure 5:
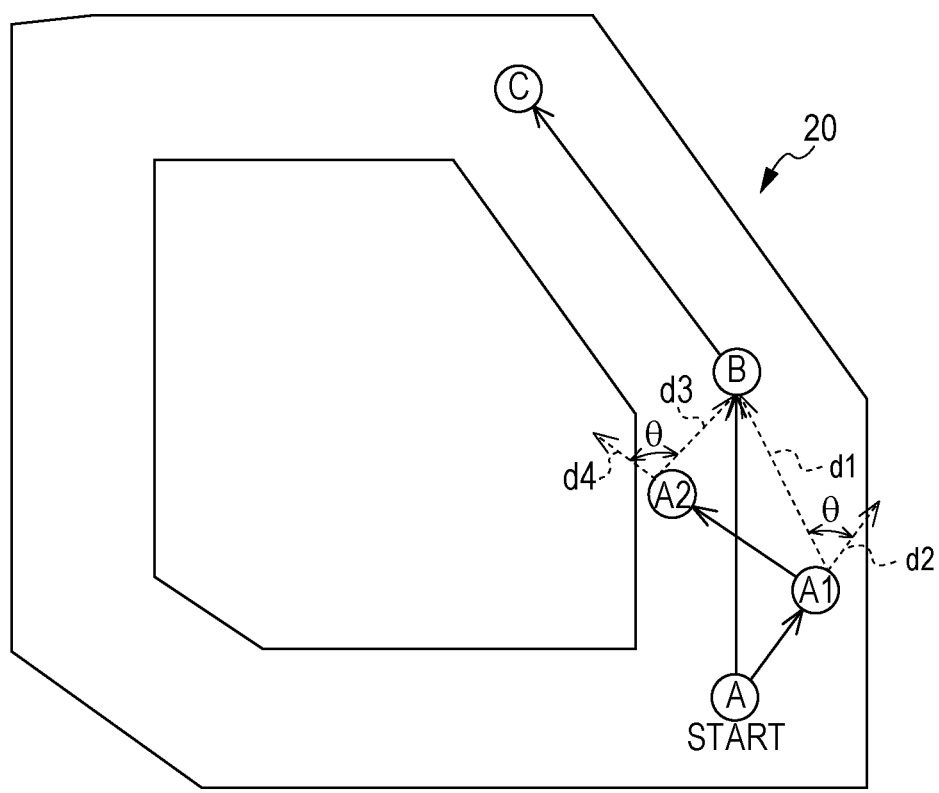
FIG. 5 is a diagram for describing how to correct a moving direction using a magnetic sensor in a second embodiment.

FIG. 5 illustrates the moving route 20, which is the same as the one illustrated in FIG. 2. The autonomous mobility apparatus 10, which has started from the point A, acquires the current position at the point A using the GPS and sets the point B as the first destination to start the movement. The autonomous mobility apparatus 10 determines whether the moving direction of the autonomous mobility apparatus 10 is toward the point B using the result of the detection by the magnetic sensor 4 when it starts from the point A. If the moving direction is not toward the point B, a stationary turn at this position is performed and the moving direction of the autonomous mobility apparatus 10 toward the point B is set. In a stationary turn, the revolution directions of the left and right wheels are reversed to turn the autonomous mobility apparatus 10 at that position. The counting of the numbers of revolutions of the wheels 7a and 7b is not started at this time.

Then, the autonomous mobility apparatus 10 starts the movement toward the point B. The counting of the number of revolutions of each of the wheels 7a and 7b is started upon start of the movement. The autonomous mobility apparatus 10 acquires the current position based on the radio wave from the GPS satellite at predetermined intervals and confirms its moving direction from the result of the detection by the magnetic sensor 4. For example, it is assumed that the current position is displaced to the position of a point A1. The autonomous mobility apparatus 10 calculates the angle θ formed by the line d1 interconnecting the current position A1 and the point B and the moving direction d2 of the autonomous mobility apparatus 10 and compares the angle θ with a predetermined threshold value. If the angle θ is greater than the threshold value, the autonomous mobility apparatus 10 stops the movement at this point. The counting the number of revolutions of the wheels 7a and 7b is stopped at this point. The autonomous mobility apparatus 10 performs a stationary turn at this position to correct the moving direction toward the point B. It starts the movement toward the point B and restarts the counting of the revolutions of the wheels 7a and 7b.

The above operation is repeated, also when the point where the next current position is acquired is a point A2, the autonomous mobility apparatus 10 calculates an angle θ formed by a line d3 interconnecting the position A2 and the point B and a moving direction d4 of the autonomous mobility apparatus 10, which is acquired from the result of the detection by the magnetic sensor 4, and if the angle θ is greater than the threshold value, the movement is stopped, the counting of the numbers of revolutions of the wheels 7a and 7b is stopped, and a stationary turn at that position is performed to correct the moving direction toward the point B.

The correction and control of the moving direction based on the result of the detection by the magnetic sensor 4 may be performed also if the acquisition of the current position using the GPS is disabled. For example, when the acquisition of the current position using the GPS is disabled, the numbers of revolutions of the wheels to the next destination is calculated from the count of the number of wheels and the straight moving distance and the movement is started. Here, the autonomous mobility apparatus 10 acquires its moving direction based on the result of the detection by the magnetic sensor 4 and corrects the moving direction through a stationary turn if the acquired moving direction is displaced from the direction toward the next destination.

Through the above control, even after the acquisition of the current position using the GPS is disabled, it is possible to continue the movement to the destination based on the result of the counting of the numbers of revolutions of the wheels and the moving distance so far when the acquisition of the current position using the GPS has been enabled.

It is possible to move to the final destination more accurately by correcting the displacement during the movement based on the result of the detection by the magnetic sensor 4.

The autonomous mobility apparatus may have a configuration in which switching between the correction and control of the moving direction according to the second embodiment (if the amount of displacement is greater than a threshold value the stop of the movement and a stationary turn are performed) and the correction and control of the moving direction according to the first embodiment (Adjustment of the revolutions of the left and right wheels is performed if the amount of shift is greater than a threshold value) is available.

Third Embodiment

In the above first embodiment, the calculation of the moving distances per revolution of the wheel, the calculation of the number of revolutions of the wheels required to reach the destination, and the determination of whether the number of revolutions of the wheels reaches the required number of revolutions of the wheels are performed for the two respective wheels provided on both sides of the vehicle body.

In a third embodiment, these processes are performed only for one wheel. For example, in the configuration illustrated in FIG. 1, the number-of-revolutions measuring unit 8a is provided for only one wheel (for example, the wheel 7a) or only the number-of-revolutions measuring unit 8a is operated and the movement is performed using the result of the measurement by the number-of-revolutions measuring unit 8a.

In the present embodiment, if the acquisition of the current position using the GPS by the current position acquiring unit 3 is disabled during the movement of the autonomous mobility apparatus 10, the control unit 1 in the autonomous mobility apparatus 10 calculates the moving distance per revolution of the wheel 7a from the moving distance of the movement based on the radio wave from the GPS satellite received by the GPS receiver unit 2 and the number of revolutions of the wheel 7a measured by the number-of-revolutions measuring unit 8a during the movement of the moving distance. Then, the number of revolutions of the wheel 7a is calculated at the distance by which it is expected to move after the acquisition of the current position is disabled and the wheel 7a is caused to rotate by the calculated number of revolutions. At this time, the other wheel 7b is also caused to rotate by the same number of revolutions. With the above configuration, it is possible to realize the automatic driving to a destination by estimating its position until radio wave is received again even if the reception state of the radio wave from the GPS satellite is degraded.

Fourth Embodiment

In the above first embodiment, the counting of the number of revolutions of each of the two wheels, the calculation of the moving distance per revolution of each wheel, the calculation of the number of revolutions of each wheel required to reach a destination if the acquisition of the current position using the GPS is disabled, and the determination of whether the number of revolutions of the wheel reaches the required number of revolutions of the wheel are performed for each wheel.

In contrast, in a fourth embodiment, in the calculation of the moving distances per revolution of the wheels based on the counted numbers of revolutions of the wheels, only if the numbers of revolutions counted for the two wheels are equal to each other, the moving distance per revolution of the wheels is calculated using the number of revolutions.

Specifically, the number-of-revolutions measuring units 8a and 8b in the autonomous mobility apparatus 10 measure the numbers of revolutions of the multiple wheels 7a and 7b in the autonomous mobility apparatus 10, respectively. If the acquisition of the current position by the current position acquiring unit 3 is disabled while the autonomous mobility apparatus 10 is moving and the numbers of revolutions of the wheels 7a and 7b measured at the moving distance by which the autonomous mobility apparatus 10 has moved based on the radio wave transmitted from the GPS satellite are equal to each other, the control unit 1 calculates the moving distance per revolution of the wheels 7a and 7b from the moving distance by which the autonomous mobility apparatus 10 has moved based on the radio wave transmitted from the GPS satellite and the numbers of revolutions of the wheels 7a and 7b measured by the number-of-revolutions measuring units 8a and 8b, respectively, during the period of the movement of the distance. Then, the control unit 1 calculates the numbers of revolutions of the wheels 7a and 7b at the distance by which it is expected to move after the acquisition of the current position has been disabled and performs a control to cause the wheels 7a and 7b to rotate by the calculated numbers of revolutions.

Accordingly, since the wheels are caused to rotate by the required number of revolutions of the wheels only if the numbers of revolutions of the left and right wheels are equal to each other as the result of the counting of the numbers of revolutions of the left and right wheels, it is possible to avoid degradation of the accuracy when the required numbers of revolutions of the left and right wheels are different from each other.

The technical features (component requirements) described in the respective embodiments may be combined with each other. The combination can form new technical features.

REFERENCE SIGNS LIST

1 control unit
2 GPS receiver unit
3 current position acquiring unit
4 magnetic sensor
5 storage unit
6a, 6b motors
7a, 7b wheels
8a, 8b number-of-revolutions measuring units
10 autonomous mobility apparatus
20 moving route
51 moving route information
52 current position information
53 number-of-revolutions information

The invention claimed is:

1. An autonomous mobility apparatus that autonomously and automatically moves along a predetermined moving route, the autonomous mobility apparatus comprising:
   a storage unit configured to store the moving route;
   a current position acquiring unit configured to acquire a current position of the autonomous mobility apparatus based on a radio wave transmitted from a satellite in a satellite positioning system;

a wheel configured to be driven to cause the autonomous mobility apparatus to move;

a control unit configured to control the driving of the wheel along the moving route stored in the storage unit based on information about the current position acquired by the current position acquiring unit; and a number-of-revolutions measuring unit configured to measure a number of revolutions of the wheel, wherein, if the acquisition of the current position by the current position acquiring unit is disabled while the autonomous mobility apparatus is moving, the control unit calculates a moving distance per revolution of the wheel from a moving distance by which the autonomous mobility apparatus has moved based on the radio wave transmitted from the satellite and the number of revolutions of the wheel measured by the number-of-revolutions measuring unit during a period in which the autonomous mobility apparatus has moved by the moving distance, calculates a number of revolutions of the wheel at a distance by which the autonomous mobility apparatus is expected to move after the acquisition of the current position is disabled based on a calculated result of the moving distance per revolution of the wheel, and performs, while the acquisition of the current position by the current position acquiring unit is disabled, a control to autonomously and automatically move the autonomous mobility apparatus by rotating the wheel by the calculated number of revolutions.

2. The autonomous mobility apparatus according to claim 1, wherein, if the acquisition of the current position by the current position acquiring unit is disabled while the autonomous mobility apparatus is moving on a straight portion, which is part of the moving route, the control unit calculates the moving distance per revolution of the wheel from the moving distance by which the autonomous mobility apparatus has moved based on the radio wave transmitted from the satellite and the number of revolutions of the wheel measured by the number-of-revolutions measuring unit during the period in which the autonomous mobility apparatus has moved by the moving distance, in a distance from a start point to an end point in the straight portion, calculates a number of revolutions of the wheel corresponding to a distance of a remaining straight portion on the moving route, and performs a control to cause the wheel to rotate by the calculated number of revolutions of the wheel.

3. The autonomous mobility apparatus according to claim 2, further comprising:

a magnetic sensor configured to detect a moving direction of the autonomous mobility apparatus, wherein the control unit corrects a moving direction of the autonomous mobility apparatus based on the moving direction of the autonomous mobility apparatus, which is indicated in a result of the detection by the magnetic sensor, to correct the moving direction so that the autonomous mobility apparatus moves to a next destination.

4. The autonomous mobility apparatus according to claim 3, wherein, if the moving direction of the autonomous mobility apparatus is displaced from the moving direction toward the next destination by a predetermined angle or more as the result of the detection by the magnetic sensor, the control unit changes revolution of the wheel of the autonomous mobility apparatus to correct the moving direction of the autonomous mobility apparatus so as to be toward the next destination, and wherein the number-of-revolutions measuring unit continues the measurement of the number of revolutions of the wheel while the current position acquiring unit is acquiring the current position based on the radio wave from the satellite.

5. The autonomous mobility apparatus according to claim 3, wherein, if the moving direction of the autonomous mobility apparatus is displaced from the moving direction toward the next destination by a predetermined angle or more as the result of the detection by the magnetic sensor, the control unit stops the autonomous mobility apparatus and controls the driving of the wheel at a position where the autonomous mobility apparatus has stopped to correct the moving direction of the autonomous mobility apparatus so as to be toward the next destination, and wherein the number-of-revolutions measuring unit measures the number of revolutions of the wheel except a time period in which the autonomous mobility apparatus stops to change the moving direction while the current position acquiring unit is acquiring the current position based on the radio wave from the satellite.

6. The autonomous mobility apparatus according to claim 2, wherein the number-of-revolutions measuring unit measures a number of revolutions of each of a plurality of wheels of the autonomous mobility apparatus, and wherein, if the acquisition of the current position by the current position acquiring unit is disabled while the autonomous mobility apparatus is moving, the control unit calculates the moving distance per revolution of each of the wheels from the moving distance by which the autonomous mobility apparatus has moved based on the radio wave transmitted from the satellite and the number of revolutions of each of the wheels measured by the number-of-revolutions measuring unit during the period in which the autonomous mobility apparatus has moved by the moving distance, calculates a number of revolutions of each of the wheels at the distance by which the autonomous mobility apparatus is expected to move after the acquisition of the current position is disabled, and performs a control to cause each of the wheels to rotate by the calculated number of revolutions.

7. The autonomous mobility apparatus according to claim 2, wherein the number-of-revolutions measuring unit measures a number of revolutions of each of a plurality of wheels of the autonomous mobility apparatus, and wherein, if the acquisition of the current position by the current position acquiring unit is disabled while the autonomous mobility apparatus is moving and the numbers of revolutions of the respective wheels measured at the distance by which the autonomous mobility apparatus has moved based on the radio wave transmitted from the satellite are equal to each other, the control unit calculates the moving distance per revolution of the wheels from the moving distance by which the autonomous mobility apparatus has moved based on the radio wave transmitted from the satellite and the number of revolutions of the wheels measured by the number-of-revolutions measuring unit during the period in which the autonomous mobility apparatus has moved by the moving distance, calculates a number of revolutions of the wheels at the distance by which the autonomous mobility apparatus is expected to move after the acquisition of the current position is disabled, and performs a control to cause each of the wheels to rotate by the calculated number of revolutions.

8. The autonomous mobility apparatus according to claim 1, further comprising:
a magnetic sensor configured to detect a moving direction of the autonomous mobility apparatus,
wherein the control unit corrects a moving direction of the autonomous mobility apparatus based on the moving direction of the autonomous mobility apparatus, which is indicated in a result of the detection by the magnetic sensor, to correct the moving direction so that the autonomous mobility apparatus moves to a next destination.

9. The autonomous mobility apparatus according to claim 8,
wherein, if the moving direction of the autonomous mobility apparatus is displaced from the moving direction toward the next destination by a predetermined angle or more as the result of the detection by the magnetic sensor, the control unit changes a revolution of the wheel of the autonomous mobility apparatus to correct the moving direction of the autonomous mobility apparatus so as to be toward the next destination, and
wherein the number-of-revolutions measuring unit continues the measurement of the number of revolutions of the wheel while the current position acquiring unit is acquiring the current position based on the radio wave from the satellite.

10. The autonomous mobility apparatus according to claim 9,
wherein the number-of-revolutions measuring unit measures a number of revolutions of each of a plurality of wheels of the autonomous mobility apparatus, and
wherein, if the acquisition of the current position by the current position acquiring unit is disabled while the autonomous mobility apparatus is moving, the control unit calculates the moving distance per revolution of each of the wheels from the moving distance by which the autonomous mobility apparatus has moved based on the radio wave transmitted from the satellite and the number of revolutions of each of the wheels measured by the number-of-revolutions measuring unit during the period in which the autonomous mobility apparatus has moved by the moving distance, calculates a number of revolutions of each of the wheels at the distance by which the autonomous mobility apparatus is expected to move after the acquisition of the current position is disabled, and performs a control to cause each of the wheels to rotate by the calculated number of revolutions.

11. The autonomous mobility apparatus according to claim 9,
wherein the number-of-revolutions measuring unit measures a number of revolutions of each of a plurality of wheels of the autonomous mobility apparatus, and
wherein, if the acquisition of the current position by the current position acquiring unit is disabled while the autonomous mobility apparatus is moving and the numbers of revolutions of the respective wheels measured at the distance by which the autonomous mobility apparatus has moved based on the radio wave transmitted from the satellite are equal to each other, the control unit calculates the moving distance per revolution of the wheels from the moving distance by which the autonomous mobility apparatus has moved based on the radio wave transmitted from the satellite and the number of revolutions of the wheels measured by the number-of-revolutions measuring unit during the period in which the autonomous mobility apparatus has moved by the moving distance, calculates a number of revolutions of the wheels at the distance by which the autonomous mobility apparatus is expected to move after the acquisition of the current position is disabled, and performs a control to cause each of the wheels to rotate by the calculated number of revolutions.

12. The autonomous mobility apparatus according to claim 8,
wherein, if the moving direction of the autonomous mobility apparatus is displaced from the moving direction toward the next destination by a predetermined angle or more as the result of the detection by the magnetic sensor, the control unit stops the autonomous mobility apparatus and controls the driving of the wheel at a position where the autonomous mobility apparatus has stopped to correct the moving direction of the autonomous mobility apparatus so as to be toward the next destination, and
wherein the number-of-revolutions measuring unit measures the number of revolutions of the wheel except a time period in which the autonomous mobility apparatus stops to change the moving direction while the current position acquiring unit is acquiring the current position based on the radio wave from the satellite.

13. The autonomous mobility apparatus according to claim 12,
wherein the number-of-revolutions measuring unit measures a number of revolutions of each of a plurality of wheels of the autonomous mobility apparatus, and
wherein, if the acquisition of the current position by the current position acquiring unit is disabled while the autonomous mobility apparatus is moving, the control unit calculates the moving distance per revolution of each of the wheels from the moving distance by which the autonomous mobility apparatus has moved based on the radio wave transmitted from the satellite and the number of revolutions of each of the wheels measured by the number-of-revolutions measuring unit during the period in which the autonomous mobility apparatus has moved by the moving distance, calculates a number of revolutions of each of the wheels at the distance by which the autonomous mobility apparatus is expected to move after the acquisition of the current position is disabled, and performs a control to cause each of the wheels to rotate by the calculated number of revolutions.

14. The autonomous mobility apparatus according to claim 12,
wherein the number-of-revolutions measuring unit measures a number of revolutions of each of a plurality of wheels of the autonomous mobility apparatus, and
wherein, if the acquisition of the current position by the current position acquiring unit is disabled while the autonomous mobility apparatus is moving and the numbers of revolutions of the respective wheels measured at the distance by which the autonomous mobility apparatus has moved based on the radio wave transmitted from the satellite are equal to each other, the control unit calculates the moving distance per revolution of the wheels from the moving distance by which the autonomous mobility apparatus has moved based on the radio wave transmitted from the satellite and the number of revolutions of the wheels measured by the number-of-revolutions measuring unit during the period in which the autonomous mobility apparatus has moved by the moving distance, calculates a number of revolutions of the wheels at the distance by which the autonomous mobility apparatus is expected to move after the acquisition of the current position is disabled, and performs a control to cause each of the wheels to rotate by the calculated number of revolutions.

15. The autonomous mobility apparatus according to claim 8,
wherein the number-of-revolutions measuring unit measures a number of revolutions of each of a plurality of wheels of the autonomous mobility apparatus, and
wherein, if the acquisition of the current position by the current position acquiring unit is disabled while the autonomous mobility apparatus is moving, the control unit calculates the moving distance per revolution of each of the wheels from the moving distance by which the autonomous mobility apparatus has moved based on the radio wave transmitted from the satellite and the number of revolutions of each of the wheels measured by the number-of-revolutions measuring unit during the period in which the autonomous mobility apparatus has moved by the moving distance, calculates a number of revolutions of each of the wheels at the distance by which the autonomous mobility apparatus is expected to move after the acquisition of the current position is disabled, and performs a control to cause each of the wheels to rotate by the calculated number of revolutions.

16. The autonomous mobility apparatus according to claim 8,
wherein the number-of-revolutions measuring unit measures a number of revolutions of each of a plurality of wheels of the autonomous mobility apparatus, and
wherein, if the acquisition of the current position by the current position acquiring unit is disabled while the autonomous mobility apparatus is moving and the numbers of revolutions of the respective wheels measured at the distance by which the autonomous mobility apparatus has moved based on the radio wave transmitted from the satellite are equal to each other, the control unit calculates the moving distance per revolution of the wheels from the moving distance by which the autonomous mobility apparatus has moved based on the radio wave transmitted from the satellite and the number of revolutions of the wheels measured by the number-of-revolutions measuring unit during the period in which the autonomous mobility apparatus has moved by the moving distance, calculates a number of revolutions of the wheels at the distance by which the autonomous mobility apparatus is expected to move after the acquisition of the current position is disabled, and performs a control to cause each of the wheels to rotate by the calculated number of revolutions.

17. The autonomous mobility apparatus according to claim 1,
wherein the number-of-revolutions measuring unit measures a number of revolutions of each of a plurality of wheels of the autonomous mobility apparatus, and
wherein, if the acquisition of the current position by the current position acquiring unit is disabled while the autonomous mobility apparatus is moving, the control unit calculates the moving distance per revolution of each of the wheels from the moving distance by which the autonomous mobility apparatus has moved based on the radio wave transmitted from the satellite and the number of revolutions of each of the wheels measured by the number-of-revolutions measuring unit during the period in which the autonomous mobility apparatus has moved by the moving distance, calculates a number of revolutions of each of the wheels at the distance by which the autonomous mobility apparatus is expected to move after the acquisition of the current position is disabled, and performs a control to cause each of the wheels to rotate by the calculated number of revolutions.

18. The autonomous mobility apparatus according to claim 1,
wherein the number-of-revolutions measuring unit measures a number of revolutions of each of a plurality of wheels of the autonomous mobility apparatus, and
wherein, if the acquisition of the current position by the current position acquiring unit is disabled while the autonomous mobility apparatus is moving and the numbers of revolutions of the respective wheels measured at the distance by which the autonomous mobility apparatus has moved based on the radio wave transmitted from the satellite are equal to each other, the control unit calculates the moving distance per revolution of the wheels from the moving distance by which the autonomous mobility apparatus has moved based on the radio wave transmitted from the satellite and the number of revolutions of the wheels measured by the number-of-revolutions measuring unit during the period in which the autonomous mobility apparatus has moved by the moving distance, calculates a number of revolutions of the wheels at the distance by which the autonomous mobility apparatus is expected to move after the acquisition of the current position is disabled, and performs a control to cause each of the wheels to rotate by the calculated number of revolutions.

19. A driving method of an autonomous mobility apparatus that autonomously and automatically moves along a predetermined moving route, the autonomous mobility apparatus having a wheel configured to be driven to cause the autonomous mobility apparatus to move, the driving method comprising:
storing the moving route in a storage unit;
acquiring a current position of the autonomous mobility apparatus based on a radio wave transmitted from a satellite in a satellite positioning system;
measuring a number of revolutions of the wheel; and
controlling the driving of the wheel along the moving route stored in the storage unit based on information about the current position, wherein, if the acquiring of the current position is disabled while the autonomous mobility apparatus is moving, a moving distance per revolution of the wheel is calculated from a moving distance by which the autonomous mobility apparatus has moved based on the radio wave transmitted from the satellite and from the number of revolutions of the wheel during a period in which the autonomous mobility apparatus has moved by the moving distance, a number of revolutions of the wheel at a distance by which the autonomous mobility apparatus is expected to move after the acquiring the current position is disabled is calculated based on a calculated result of the moving distance per revolution of the wheel, and a control is performed, while the acquisition of the current position by the current position acquiring unit is disabled, to autonomously and automatically move the autonomous mobility apparatus by rotating the wheel by the calculated number of revolutions.

20. A non-transitory computer-readable medium in which a computer program is stored for driving an autonomous mobility apparatus that autonomously and automatically moves along a predetermined moving route, the autonomous mobility apparatus having a wheel configured to be driven to cause the autonomous mobility apparatus to move, the computer program being configured to cause a computer to perform:
  storing the moving route in a storage unit;
  acquiring a current position of the autonomous mobility apparatus based on a radio wave transmitted from a satellite in a satellite positioning system;
  measuring a number of revolutions of the wheel; and
  controlling the driving of the wheel along the moving route stored in the storage unit based on information about the current position, wherein, if the acquiring of the current position is disabled while the autonomous mobility apparatus is moving, a moving distance per revolution of the wheel is calculated from a moving distance by which the autonomous mobility apparatus has moved based on the radio wave transmitted from the satellite and from the number of revolutions of the wheel during a period in which the autonomous mobility apparatus has moved by the moving distance, a number of revolutions of the wheel at a distance by which the autonomous mobility apparatus is expected to move after the acquiring the current position is disabled is calculated based on a calculated result of the moving distance per revolution of the wheel, and a control is performed, while the acquisition of the current position by the current position acquiring unit is disabled, to autonomously and automatically move the autonomous mobility apparatus by rotating the wheel by the calculated number of revolutions.

* * * * *